US006989407B2

(12) United States Patent
Lapin

(10) Patent No.: US 6,989,407 B2
(45) Date of Patent: Jan. 24, 2006

(54) RADIATION CURABLE LAMINATING ADHESIVES BASED ON CYCLOALIPHATIC CARBOXYLIC ACID FUNCTIONAL MONOMERS

(75) Inventor: Stephen C. Lapin, Waterford, WI (US)

(73) Assignee: Northwest Coatings, LLC, Oak Creek, WI (US)

( * ) Notice: Subject to any disclaimer, the term of this patent is extended or adjusted under 35 U.S.C. 154(b) by 0 days.

(21) Appl. No.: 11/029,412

(22) Filed: Jan. 6, 2005

(65) Prior Publication Data

US 2005/0163960 A1 Jul. 28, 2005

Related U.S. Application Data

(60) Provisional application No. 60/534,998, filed on Jan. 9, 2004.

(51) Int. Cl.
*C08F 2/46* (2006.01)
*B32B 27/00* (2006.01)

(52) U.S. Cl. ...................... 522/153; 522/150; 522/154; 522/157; 522/178; 522/181; 522/182; 522/183; 522/152; 522/176; 428/216; 428/306.6; 428/308.8; 428/335; 428/483; 428/511; 428/516; 156/244.17; 156/273.7

(58) Field of Classification Search ................ 522/150, 522/153, 154, 157, 178, 181, 182, 183, 184; 156/244.17, 273.7; 428/216, 306.6, 308.8, 428/516, 335, 483, 511
See application file for complete search history.

(56) References Cited

U.S. PATENT DOCUMENTS 3,810,825 A 5/1974 Mani
4,374,898 A 2/1983 Mahr
4,389,472 A 6/1983 Neuhaus et al.
4,533,723 A 8/1985 Weitemeyer
4,643,730 A 2/1987 Chen et al.
4,704,310 A 11/1987 Tighe et al.
4,767,654 A 8/1988 Riggsbee
5,202,361 A 4/1993 Zimmerman et al.
5,262,216 A 11/1993 Popat et al.
5,284,688 A 2/1994 Hiatt
5,286,128 A 2/1994 Gillum
5,385,772 A 1/1995 Slovinsky et al.
5,399,396 A 3/1995 Ohlsson et al.
5,672,224 A 9/1997 Kaufmann
5,830,571 A 11/1998 Mann et al.
5,861,201 A 1/1999 Blackwelder et al.
5,874,143 A 2/1999 Peloquin et al.
5,912,381 A 6/1999 Narayan et al.
6,472,056 B1 10/2002 Rea et al.
6,610,376 B1 8/2003 Rangwalla et al.
6,720,050 B2 * 4/2004 Rea et al. .................. 428/35.7

FOREIGN PATENT DOCUMENTS

EP 0198374 A2 10/1986
EP 056939 B1 3/1998
JP 54093026 7/1979
JP 58108280 6/1983
JP 59179675 10/1984
JP 06107993 A 4/1994
WO WO 02/081576 10/2002

OTHER PUBLICATIONS

Trakhtenberg, "Factors Affecting Bond Strenghts of UV Curable Laminating Adhesives", Northwest Coatings Corp., 1998, Oak Creek, Wisconsin.

* cited by examiner

*Primary Examiner*—Sanza L. McClendon
(74) *Attorney, Agent, or Firm*—Jeffrey S. Melcher; Manelli Denison & Selter, PLLC

(57) ABSTRACT

Provided are radiation-cured, laminated materials, radiation-curable adhesive compositions suitable for use in forming the laminated materials, and methods of making laminated materials. The radiation-curable composition includes the use of a cycloaliphatic carboxylic acid functional monomer

42 Claims, 9 Drawing Sheets

RADIATION CURABLE LAMINATING ADHESIVES BASED ON CYCLOALIPHATIC CARBOXYLIC ACID FUNCTIONAL MONOMERS

This application claims priority to U.S. Ser. No. 60/534,998, filed Jan. 9, 2004, the complete disclosure of which is incorporated herein by reference.

FIELD OF THE INVENTION

The invention relates to radiation-cured, laminated materials, radiation-curable adhesive compositions suitable for use in forming the laminated materials, and methods of making laminated materials.

BACKGROUND OF THE INVENTION

Laminated packaging is widely used for food, non-food, and pharmaceutical applications. Laminated packaging includes flexible packaging and rigid packaging (folding cartons). Various other laminated industrial or consumer products are also common. These include labels and various types of cards for identification, membership, promotional purposes, etc. Laminated packaging uses a wide range of different types of materials including various types of plastic films, paper, and aluminum foil. The plastic films include various types of polyolefins, polyesters, and polyamides. The films may be various combinations of homopolymers, copolymers, and polymer blends. The films may be a single layer or may be coextruded in multiple layers. The films are also commonly coated, metallized, or otherwise treated to enhance the performance of the resulting package. Packaging materials are selected based on a variety of factors including desired barrier properties, appearance, cost, physical feel, printability, sealing properties, easy open features, and reclosing features.

Two main classes of flexible packaging materials are: 1) mono-web packaging, which includes a mono-web of a coextruded film; and 2) laminated packaging. Laminate packaging is often desired due to the fact that it is advantageous to combine two or more webs in order two obtain the desired properties of the resulting package. Reasons for using laminated packaging constructions include: 1) to contain the graphics between layers in order to provide protection and enhanced appearance; 2) to maintain product freshness by taking advantage of the barrier properties of the individual layers; 3) to combine a heat stable web for printing with a heat sealable web for sealing the package; 4) to provide desired feel and handling properties to maximize consumer appeal; 5) to enhance the package strength in order to maintain integrity for filling, shipping, and consumer handling.

Several different technologies are used to bond the layers used in laminated packaging. Two classes of laminating technology are extrusion lamination and adhesive lamination. Extrusion lamination involves melting and depositing a layer of thermal plastic resin such as polyethylene between two webs of packaging materials. The different types of adhesives currently used to laminate flexible packing materials include: 1) one component solvent base; 2) two component solvent base; 3) one component water base; 4) two component water base; and 5) two component solventless.

Solvent base adhesives have inherent limitations that include: 1) emission of volatile organic compounds (VOCs); 2) high cost of solvent incineration or recovery equipment; 3) flammability; and 4) analysis and control of residual solvents in the package.

Water base adhesives have inherent limitations that include: 1) the need for extended drying equipment; 2) the effect of heat used in drying on thermally sensitive packaging films; 3) variable drying rates dependant on ambient humidity levels; and 4) difficulty in starting and stopping due to adhesive drying on the application equipment.

Any two component system (solvent base, water base, or solventless) has inherent disadvantages that include: 1) the need for accurate mixing of the two components; 2) limited pot life of the mixed components; and 3) the time delay (typically 2 to 5 days) required for the two components to react to achieve the final adhesive properties. Other limitations associated with two component solventless adhesives include: 1) the need for heated application equipment; and 2) residual toxic aromatic amines, which are byproducts of isocyanate based curing systems.

Radiation-curable adhesives can potentially offer numerous advantages over these other flexible packaging laminating adhesives. They may offer: 1) stable one-part compositions; 2) little or no VOCs; and 3) full adhesive performance immediately upon cure. UV curable laminating adhesives require at least one layer of packing material that is sufficiently transparent to allow penetration of UV light to cure the adhesive. EB curing has the added advantage of being able to penetrate opaque or printed packaging materials in order to cure the adhesive.

The main challenge in the development of radiation-curable laminating adhesives are: 1) to provide bonding and chemical resistance that is adequate for desired packaging application; and 2) have low odor, taint, and migration to allow packaging of food and pharmaceutical products.

Radiation-curable materials such as inks and coatings are generally based on relatively low molecular weight reactive monomers and oligomers. The components are designed to be converted to high molecular weight polymers upon UV or EB irradiation. High conversions of the low molecular weight components can be achieved; however, some residual amount of monomer or oligomers normally remains. These residual components can be responsible for odor, taint, and migration issues in the packaging. The art of radiation-curable inks and coatings does not address the same problems associated with flexible laminate packaging materials, and, thus, one skilled in the art would not be motivated to look to the art of radiation-curable inks and coatings when addressing the problems associated with radiation-curable adhesives for use in laminates.

A discussion of the issues associated with the use of radiation-curable materials in food packaging applications may be found in PCT Application number WO 02/081576 (Chatterjee), which is incorporated herein by reference. The compositions disclosed by Chatterjee contain water, which is displaced from the ink or coating upon radiation-curing. This cannot be done with a laminating adhesive since the water would be trapped between two layers of packaging materials and, thus, Chatterjee is not helpful in addressing the problems associated with radiation-curable adhesives for use in making laminates.

Strong interest in electron beam (EB) curable laminating adhesives began about 4 years ago. This interest was driven in part by the development of a new generation of lower voltage, lower cost, electron beam equipment. A discussion of the low voltage equipment may be found in U.S. Pat. No. 6,610,376 (Rangwalla), which is incorporated herein by reference. The low voltage equipment allowed efficient energy deposition in coating or adhesive layers while minimizing adverse effects of the EB energy on the substrates. The advantages of EB laminating have been reviewed in multiple publications. The most obvious advantage is the instant bonding characteristics in contrast to adhesives based on the reaction of isocyanates with polyols that can take several days to reach the desired performance properties.

While EB laminating adhesives technology has emerged in some industrial applications, commercial use in food packaging has been limited. This is due in part to the limited performance properties of the adhesives including limited water resistance.

In radiation-curable laminating adhesives, the residual low molecular weight components are initially found within the cured adhesive, which is located between two layers of packaging materials. Some types of packaging materials, such as aluminum foil, are good barrier materials and are effective for preventing migration of low molecular weight components in to the food or pharmaceutical product. Other packaging materials, such as polyolefin based materials, are known to be less effective barriers to migration of low molecular weight organic compounds. Thus, there is a need for a radiation-curable adhesive material that when suitably cured exhibits substantially reduced migration through layers in a laminated packaging material.

Laminated packaging materials also have problems with delamination of the layers during normal use, especially when the package contains aggressive liquids or certain aggressive food products. Delamination can also be an issue during processing or the package. This can include the addition of closures, filling, sealing, and heat processing. Thus, there is a need for a radiation-curable adhesive material that when suitably cured exhibits sufficient adhesion to prevent delamination of the layers during normal use.

SUMMARY OF THE INVENTION

An objective of the invention is to provide radiation-cured, laminated packaging materials, which do not leach residual radiation-curable monomers into the contents thereof and exhibit sufficient adhesion to avoid delamination of the layers during normal use.

Another objective is to provide radiation-curable laminating adhesives that can be used to form laminated packaging materials which do not leach radiation-curable monomers into the contents thereof and exhibit sufficient adhesion to avoid delamination of the layers during normal use.

These objects and other objects can be obtained by a radiation-curable laminating adhesive composition comprising 10 to 100% by weight of at least one cycloaliphatic carboxylic acid functional monomer based on the total weight of the composition.

These objects and other objects are also obtained by a laminated material comprising at least two layers bonded together by at least one layer of radiation-cured laminating adhesive, wherein the radiation-cured laminating adhesive is formed by radiation curing a radiation-curable laminating adhesive composition comprising from 10 to 100% of at least one cycloaliphatic carboxylic acid functional monomer based on the total weight of the composition.

These objects and other objects are further obtained by a process for forming a laminated material comprising: applying a radiation-curable laminating adhesive composition comprising from 10 to 100% by weight of at least one cycloaliphatic carboxylic acid functional monomer based on the total weight of the composition, to at least one first layer; pressing at least one second layer in contact with the radiation-curable composition thereby forming a laminated structure; and applying radiation to the laminated structure to cure the radiation-curable composition and bond the laminate layers.

DETAILED DESCRIPTION OF PREFERRED EMBODIMENTS

Figure 1:
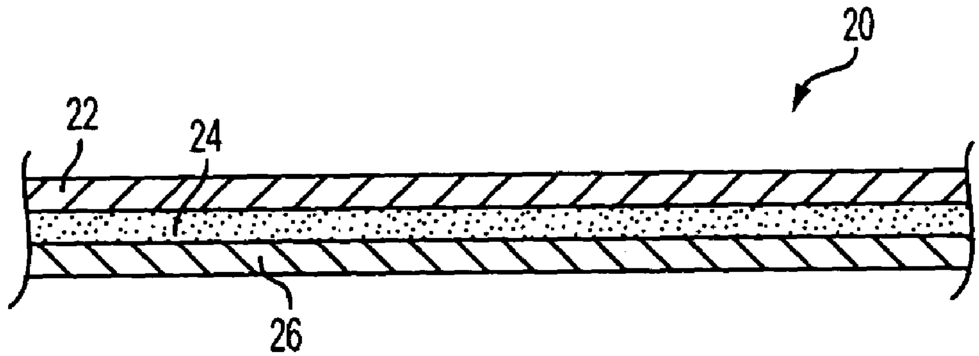
FIG. 1 illustrates a side, cross-sectional view of a radiation-cured, laminated packaging material.

It has now been found that the use of cycloaliphatic carboxylic acid functional monomers in radiation-curable laminating adhesives provide unexpected improvements in bond strength and water resistance of the resulting laminate structures, as well as improved resistance to migration.

As disclosed in our U.S. Pat. Nos. 6,720,050 and 6,472,056, the complete disclosures of which are incorporated herein by reference, radiation cured adhesives can have low levels of residual monomers remaining after the curing process. Carboxylic acid functional monomers have been found to have low migration through packaging materials including polyolefins. We have now found that cycloaliphatic carboxylic acid monomers have surprisingly lower migration properties compared to other monomers including monomers based on the half ester of 2-hydroxyethyl acrylate (HEA) and succinic anhydride (monoacryloxyethyl succinate, MAES).

Another unexpected advantage of cycloaliphatic carboxylic acid functional monomers is significantly reduced skin irritation properties. For example, the half ester of HEA with hexahydrophthalic anhydride (monoacryloxyethyl hexahydrophthalate, MAHP) produces a non-corrosive response to a membrane test while MAES produces a corrosive response to the same test.

Radiation-curable Laminating Adhesive

The radiation-curable laminating adhesive (hereinafter referred to as "radiation-curable adhesive composition") comprises 10 to 100% of at least one cycloaliphatic carboxylic acid functional monomer based on the total weight of the composition. Preferably, the cycloaliphatic carboxylic acid functional monomer is present in an amount of from about 20 to about 80%, and more preferably from about 30 to about 70%, based on the total weight of the composition.

The composition can include from 10 to 90% by weight of non-cycloaliphatic carboxylic acid functional monomers, based on the total weight of the composition. The term "non-cycloaliphatic carboxylic acid functional monomer" is understood to include all other carboxylic acid functional monomers not included in the definition of "cycloaliphatic carboxylic acid functional monomers."

Preferably, the composition contains at least 50% by weight of carboxylic acid functional monomers, based on the total weight of the composition. The term "carboxylic acid functional monomer" includes both the cycloaliphatic and non-cycloaliphatic carboxylic acid functional monomers. More preferably, the composition contains at least 80% by weight carboxylic acid functional monomers and even more preferably at least 90% by weight carboxylic acid functional monomers. If desired, the composition can contain substantially 100% of carboxylic acid functional monomers.

The carboxylic acid functional monomer preferably has a number average molecular weight of from about 100 to about 3000, more preferably from about 150 to about 2000, and most preferably from about 200 to about 1500. The simplest type of carboxylic acid functional monomer is acrylic acid. However, acrylic acid is not desirable because of odor, toxicity and low molecular weight. Therefore, preferred radiation-curable adhesive compositions are substantially free of acrylic acid.

Any method for making the cycloaliphatic carboxylic acid functional monomer can be used, including newly developed methods. Since the formation of carboxylic acid functional monomers is now well known and fully described in our related parent applications, the formation of preferred cycloaliphatic carboxylic acid functional monomers will be described. One skilled in the art will easily be able to form the desired cycloaliphatic carboxylic acid functional monomer based on present description in combination with well known reaction mechanisms. For example, using the well known reaction between a hydroxyl functional group and an anhydride, a compound containing both a hydroxyl functional group and a desired radiation-curable functional group can be reacted with an anhydride compound to form the desired carboxylic acid functional monomer. The required cycloaliphatic group(s) can be present on any of these reactants.

Preferably, the cycloaliphatic carboxylic acid monomers are produced by reacting hydroxyl-functional monomers with cycloaliphatic anhydrides. Examples of preferred cycloaliphatic anhydrides include, but are not limited to, hexahydrophthalic anhydride and substituted-hexahydrophthalic anhydride.

The term substituted-hexahydrophthalic is understood to mean groups can be substituted for the hydrogen atoms present on the hexane ring. Preferred groups are alkyls, such as methyl, ethyl, propyl and butyl. A particularly preferred substituted-hexahydrophthalic anhydride is methylhexahydrophthalic anhydride. Other suitable groups include halides, such as fluorine, chlorine, bromine and iodine. While not preferred, any other group may be utilized as desired, such as amines, alkenes, aryls, ethers, esters, ketones, etc.

If desired, other size rings can be utilized, such as 3, 4, 5 and 7 carbon rings. Furthermore, more than one ring can be present, such as bicyclic anhydrides. An example of a commercial bicyclic anhydride is nadic methyl anhydride. An example of a substituted-bicyclic anhydride is chlorendic anhydride. While saturated cycloaliphatic ring structures are generally preferred, some residual unsaturation may remain in the ring. An example of structure with remaining unsaturation is tetrahydrophthalic anhydride.

While not preferred, it may be possible to use a heterocyclic ring, such as one or more of the carbons on the ring being replaced with sulphur, oxygen or nitrogen.

When the cycloaliphatic group is provided by other reactants any suitable anhydride can be utilized including, but not limited to: phthalic anhydride; maleic anhydride; trimellitic anhydride; adipic anhydride; azelaic anhydride; sebacic anhydride; succinic anhydride; glutaric anhydride; malonic anhydride; pimelic anhydride; suberic anhydride; 2,2-dimethylsuccinic anhydride; 3,3-dimethylglutaric anhydride; 2,2-dimethylglutaric anhydride; dodecenylsuccinic anhydride; octenyl succinic anhydride, HET anhydride; and the like.

The compound containing a hydroxyl functional group and a radiation-curable functional group ("hydroxy functional, radiation-curable compound") can contain any desired radiation-curable functional group suitable for the desired application. The radiation-curable functional group preferably comprises ethylenic unsaturation. Examples of suitable ethylenic unsaturation include acrylate, methacrylate, styrene, vinylether, vinyl ester, N-substituted acrylamide, -vinyl amide, maleate esters or fumarate esters. Preferably, the ethylenic unsaturation is provided by an acrylate or methacrylate group. Use of the term "(meth)acrylate" refers to either acrylate or methacrylate, or mixtures thereof.

Examples of suitable hydroxy functional, radiation-curable compounds containing (meth)acrylate groups include the following, but are not limited thereto: 2-hydroxyethyl (meth)acrylate; 2-hydroxypropyl(meth)acrylate; 2-hydroxybutyl(meth)acrylate; 2-hydroxy 3-phenyloxypropyl(meth) acrylate; 1,4-butanediol mono(meth)acrylate; 4-hydroxycyclohexyl(meth)acrylate; 1,6-hexanediol mono (meth)acrylate; neopentylglycolmono(meth)acrylate; trimethylolpropane di(meth)acrylate; trimethylolethane di(meth) acrylate; pentaerythritol tri(meth)acrylate; dipentaerythritol penta(meth)acrylate; and hydroxy functional (meth)acrylates represented by the following formula, $$CH_2{=}\overset{\displaystyle R_1}{\overset{|}{C}}{-}\overset{\displaystyle O}{\overset{\|}{C}}OCH_2CH_2{-}(O\overset{\displaystyle O}{\overset{\|}{C}}CH_2CH_2CH_2CH_2CH_2)_n{-}OH$$

wherein $R_1$ is a hydrogen atom or a methyl group and n is an integer from 1 to 5. Commercially available examples include the hydroxy terminated (meth)acrylate prepolymers sold as "Tone" prepolymers (Dow Chemical). The (meth) acrylate compounds can be used either alone or in admixture of two or more of them. Among these (meth)acrylate compounds, 2-hydroxyethyl(meth)acrylate and 2-hydroxypropyl (meth)acrylate are especially preferred. Examples of hydroxy functional, radiation-curable compounds having vinyl ether functional groups include, for example, 4-hydroxybutyl vinyl ether, and triethylene glycol monovinyl ether.

Preferably, the radiation-curable functional group is acrylate or methacrylate, with acrylate being the most preferred.

The half ester formed from reaction product of 2-hydroxyethyl acrylate with succinic anhydride is monoacyloxethylsuccinate (MAES). The cycloaliphatic half ester formed from the reaction of 2-hydroxyethylacrylate with hexahydrophthalic anhydride is monoacryloxyethyl-hexahydrophthalate (MAHP). The cycloaliphatic half ester formed from the reaction of 2-hydroxyethylacrtlate with methylhexahydrophthalic anhydride is monacryloxyethyl-methylhexahydrophthalate (MAMHP). These are the most preferred carboxylic acid functional monomers of the present invention.

If desired, the cycloaliphatic carboxylic acid functional monomer can also be formed by reacting a suitable dicarboxylic acid functional compound with a hydroxy functional, radiation-curable compound. However, this method is not preferred since water is formed during the reaction of the hydroxyl group with a carboxylic acid group, which water must be removed prior to use of the carboxylic monomer in the radiation-curable adhesive composition.

Cycloaliphatic carboxylic acid functional monomers and oligomers can also be formed by various combinations of polyanhydrides and/or polyols, as desired.

One skilled the art will easily be able to formulate the radiation-curable adhesive composition to provide a suitable viscosity for the desired application. Usually, the viscosity of the radiation-curable adhesive composition should be low, for example about 3000 centipoise or less, at the application temperature, to facilitate application to the substrate. Usually, the application temperature is room temperature (25° C.). However, higher application temperatures can be utilized as desired. The carboxylic acid functional monomer, or the combined viscosity of a mixture of multiple carboxylic acid functional monomers, preferably has a low viscosity, in order to avoid the use of diluent monomers, to provide a viscosity that is suitable for application of the radiation-curable adhesive to a layer of flexible packaging material. Suitable viscosities of the carboxylic acid functional monomer, or the combined viscosity of a mixture of multiple carboxylic acid functional monomers, include from about 50 to about 10,000 centipoise at the application temperature, more preferably from about 100 to about 5000 centipoise at the application temperature.

When the radiation-curable adhesive is formulated for curing by exposure to visible light, ultraviolet light, or the like, one or more photoinitiators and/or photosensitizers can be used as polymerization initiators to enhance the cure speed. Examples of suitable photoinitiators and photosensitizers include but are not limited to: 2,2'-(2,5-thiophenediyl) bis(5-tert-butybenzoxazole); 1-hydroxycyclohexyl phenyl ketone; 2,2-dimethoxy-2-phenylacetophenone; xanthone; fluorenone; anthraquinone; 3-methylacetophenone; 4-chlorobenzophenone; 4,4'-dimethoxybenzophenone; 4,4'-diaminobenzophenone; Michler's ketone; benzophenone; benzoin propyl ether; benzoin ethyl ether; benzyl dimethyl ketal, 1-(4-isopropylphenyl)-2hydroxy-2-methylpropane-1-one; 2-hydroxy-2-methyl-1phenylpropane-1one; methylbenzoyl formate thioxanthone; diethylthioxanthone; 2-isopropylthioxanthone; 2-chlorothioxanthone; 2-methyl-1-(4-(methylthio)phenyl)-2-morpholinopropane-1-one; and 2,4,6-trimethylbenzoyidiphenylphosphine oxide. Commercially available examples include IRGACURE 184, 369, 500, 651, 819, 907, and 2959, and Darocur 1173 (Ciba Geigy); Lucirin TPO (BASF); and Ebecryl P36 and P37 (UCB Co.).

Preferably, polymeric or multifunctional photoinitiators are utilized in the radiation-curable adhesive composition. The use of polymeric or multifunctional photoinitiators further reduces the possibility of photoinitiator or fragments of the photoinitiator from migrating. Examples of suitable polymeric and multifunctional photoinitiators include, but are not limited to, the commercially available KIP 100, KIP 150 and Esacure ONE (Lamberti).

Polymerizable photoinitiators containing a (meth)acrylate group in addition to photosensitive moiety may be used in the radiation-curable composition. The use of polymerizable photoinitiators causes the photoinitiator or fragments of the photoinitiator to be copolymerized with the adhesive upon curing further reducing the possibility of photoinitiator or fragment of the photoinitiator from migrating.

If desired, one or more photoinitiators and/or photosensitizers can be incorporated in the radiation-curable adhesive coating composition in an amount of about 0.1 to about 10% by weight of the total composition.

If the radiation-curable adhesive composition is formulated to utilize a free-radical curing system by exposure to an electron beam (EB), a photoinitiator is generally not beneficial and, preferably, the composition is free of photoinitiators. However, in cationically cured systems, a photoinitiator is beneficial even when performing an EB cure. Based on the disclosure provided herein, one skilled in the art of formulating radiation-curable adhesive compositions will easily be able formulate a suitable curing system for the desired application, without undue experimentation.

The radiation-curable adhesives can also contain radiation-curable oligomers. Migration is generally not a concern with oligomers due to their higher molecular weight relative to the molecular weight of monomers. (Meth)acrylate functional oligomers are preferred. These include but are not limited to epoxy(meth)acrylates, urethane(meth)acrylates, polyester(meth)acrylate oligomers, (meth)acrylated acrylic oligomers, and (meth)acrylated oligomers based on copolymers of maleic anhydride, such as those sold under the tradename of Sarbox (Sartomer).

While it is preferable that most of the monomers used in the radiation-curable adhesives will be carboxylic acid functional monomers, it may be desirable to include up to about 50% of other non-carboxylic acid monomers to reduce viscosity, modify flow and leveling properties, and provide crosslinking. Preferred non-carboxylic acid functional monomers are (meth)acrylate monomers having one to six (meth)acrylate groups. Suitable examples include, but are not limited to: laural acrylate, tridecyl acrylate, ethoxylated phenol acrylate, tripropylene glycol diacrylate, propoxylated neopenylglycol diacrylate, trimethylol propane triacrylate, ethoxylated trimethylol propane triacrylate, and propoxylated glycerol triacrylate.

The adhesive compositions provide improved bond strength and improved water resistance properties when suitably cured in laminated structures, such that the organic titanate compounds described in our U.S. application Ser. No. 10/347,463, filed Jan. 21, 2003, the complete disclosure of which is incorporated herein by reference, are not necessary. However, the titanates described therein can be utilized if desired.

The radiation-curable adhesive can also include additives such as fillers, flow additives, anti-foaming additives, pigments, dyes, or resinous materials dispersed or solubilized in the composition. The selection and use of such additives is within the skill of the art.

When suitably cured, the cycloaliphatic carboxylic acid functional monomers used in the present invention have been found to provide the unexpected combination of sufficient adhesion to low surface energy layers, such as polyolefin protective films, to avoid delamination and substantially avoid migrating through the layers the in the uncured free-monomer form.

The invention also provides a method of providing a cured adhesive with a desired $T_g$. While any desired $T_g$ can be provided, a preferred range of $T_g$'s is from 20 to 30° C.

The $T_g$ can easily be finely tailored by adjusting the relative amount of carboxylic acid functional monomer and cycloaliphatic carboxylic acid functional monomer. See the results in Table 4 below, which clearly demonstrates how varying the ratio of MAES:MAHP dramatically changes the $T_g$ throughout the range of 20 to 30° C. Based on this teaching, a skilled person will easily be able to select a desired carboxylic acid functional monomer and a cycloaliphatic carboxylic acid functional monomer and adjust the relative amounts to provide a desired $T_g$. Preferably, the $T_g$ should be selected close to the operating temperature of the laminated material. As can be seen from FIG. 8, the $T_g$ was selected to be about room temperature, 22.4° C. At about 50° C. a plateau in the storage modulus (G') can be seen that continues past 100° C. This means the adhesive will be very stable over this temperature range, such that the laminate will be resistant to peeling when the laminated package is used at elevated temperatures.

The radiation-curable adhesive composition can also be used to form improved laminated materials, as described below.

Laminated Flexible Packaging Material

The formation of laminated flexible packaging materials is well-known and therefore will not be discussed in detail herein. The novel laminated flexible packaging materials described herein can be easily produced using conventional techniques and replacing conventional laminating adhesives with the radiation-curable laminating adhesives described herein. Preferred methods of applying the radiation-curable adhesive includes use of well-known web coating methods such as roll coating, gravure, offset gravure, etc. The adhesive may be applied and cured in-line with the printing or off-line in a separate laminating step as desired.

When using low surface energy layers, such as polyolefins, preferably the surface of the layer to be bonded has been surface-treated to enhance adhesion. Surface treating is well known and any conventional surface treating method can be used as desired for the particular application. Examples of suitable surface treating methods include corona treatments, chemical treatments, plasma, and flame treatments. Preferably, when a polyolefin based layer is utilized a corona treatment or flame treatment is first applied to the surface prior to bonding with a radiation-curable adhesive.

Figure 2:
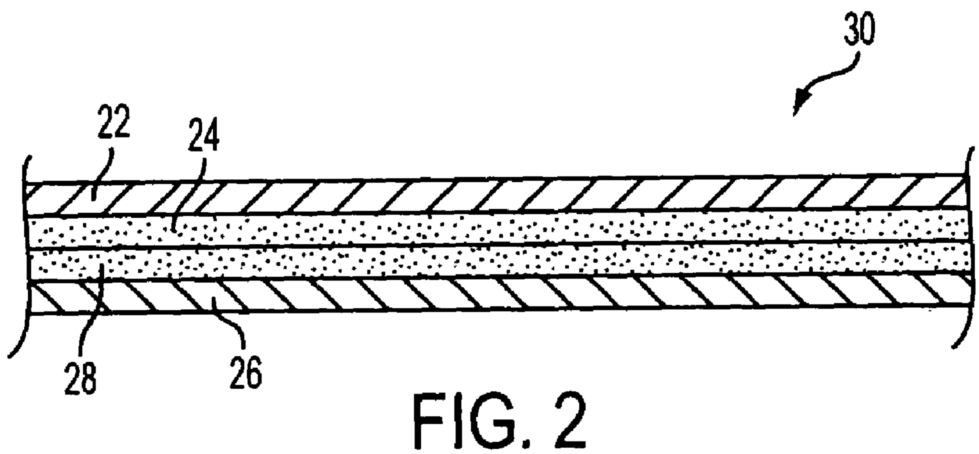
FIG. 2 illustrates a side, cross-sectional view of a radiation-cured, laminated packaging material.
Figure 3:
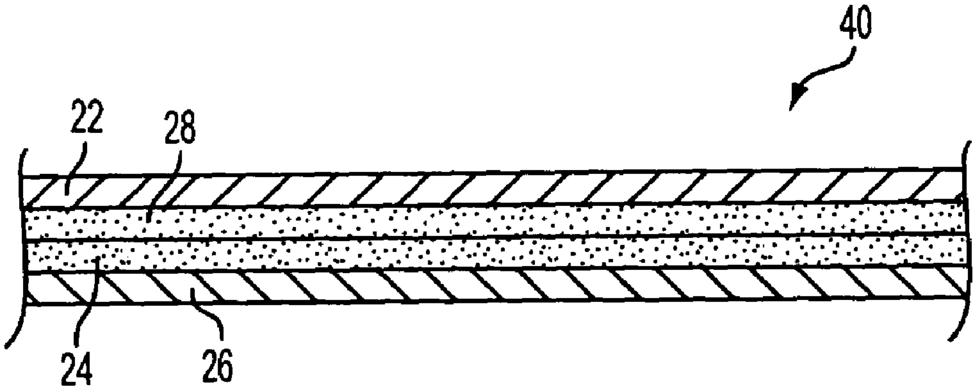
FIG. 3 illustrates a side, cross-sectional view of a radiation-cured, laminated packaging material.

The laminated flexible packaging material will be described with reference to FIGS. 1–3. As shown in FIGS. 1–3, the laminated flexible packaging material 20 includes at least one second layer of flexible packaging material 22 laminated to a first layer of flexible packaging material 26 by the novel radiation-cured, adhesive 24, where layer 26 is the layer that will be on the inside of the finished package. The laminated flexible packaging material 20 can also include other layers as desired. Examples of suitable materials for the at least one second layer 22 and first layer 26 include, but are not limited to: paper, aluminum foil, metalized films, coated films, printed films, co-extruded films, polyester films, polyolefin based films, white polyolefin based films, polyamide based films, copolymer films, and films containing various polymer blends. Preferably, the first layer 26 is polyolefin based.

The radiation-curable laminating adhesive described herein can be used to provide an improved laminated flexible packaging material in which the problem of contamination from migrating monomers is substantially reduced. It has been found that the carboxylic acid monomers of the radiation-curable adhesive composition migrate through layers of the flexible packaging materials, especially polyolefins, in significantly less amounts than monomers used in conventional radiation-curable adhesives. It has also been found that the carboxylic acid monomers used in the present invention provide sufficient adhesion to many types of packaging materials when suitably cured to avoid delamination of the laminated flexible packaging material during use.

The radiation-curable, adhesive composition described herein can be applied and cured using conventional techniques, such as by UV light from medium pressure mercury lamps directly through the layers. When using ultra-violet (UV) light to cure the radiation-curable adhesive composition, a polymeric material should be selected which does not prevent or substantially inhibit curing of the radiation-curable adhesive by absorbing or shielding the UV light. Thus, at least one of the second layer 22 or the first layer 26 is preferably substantially clear when UV curing is desired. A substantially clear layer 22 can be formed from any suitable material. Examples of suitable substantially clear polymeric materials include polyolefins, polyesters and polystyrenes. Preferably, the layer 22 is formed from a polyolefin.

Electron beam radiation (EB) is preferably used to cure the radiation-curable adhesive composition since the composition is simplified in that no photoinitiators are necessary. Furthermore, the layer 22 and the layer 26 do not need to be substantially clear when EB curing is utilized.

Examples of suitable polyolefins for use in a preferred layer 26 and/or when polyolefin is used in the layer 22 include, but are not limited to, homopolymers or copolymers of ethylene, butylene, propylene, hexene, octene, etc. Preferred polyolefin based films include polypropylene and polyethylene, such as high-density polyethylene (HDPE) or linear-low-density polyethylene (LLDPE), polyiosbutylene (PIB). Oriented forms of polypropylene can be used as desired, such as biaxially oriented (BOPP) or oriented polypropylene (OPP).

If desired, the polyolefin for use in layer 22 or 26 may be coated, blended, copolymerized or coextruded with other materials to enhance the barrier, handling, appearance or sealing properties. These modifications are included in the definitions of "polyolefin based" and "comprising polyolefin" for the layers 22 or 26. Common coatings include polyvinylidene chloride (PVdC), acrylic based coatings, and various other barrier and heat-seal coatings. The polyolefin may also receive a thin layer of metal using a vacuum metallization process. Common polyolefin copolymers used to produce films for flexible packaging include copolymers of ethylene and vinlyacetate (EVA), and ethylene and vinyl alcohol (EVOH), ethylene and acrylic acid, ethylene and ethyl acrylate. In spite of the fact that many of these modifications are known to improve the barrier properties of polyolefins, a migrating resistant laminating adhesive is still desirable to prevent off-flavor and odor in the packaged product.

U.S. Pat. No. 5,399,396 discloses further examples of suitable layers for use in the laminated flexible packaging material, which are incorporated herein by reference. Other suitable layers are described in Diane Twede and Ron Goddard, "Packaging Materials," $2^{nd}$ Edition, Pira International, Surry, UK 1998.

Another example of a laminated flexible packaging material is shown in FIG. 2, which includes a clear layer 26 comprising a polyolefin which has been reverse printed 28 on inside surface thereof and then bonded to a layer 22 using the radiation-curable, adhesive composition 24. In this type package, the printed material would be readable on the inside surface of the package.

As shown in FIG. 3, another example of laminated flexible packaging material includes a clear layer 22 which has been reverse printed 28 on inside surface thereof and then bonded to a layer 26 using the radiation-curable, adhesive composition 24. In this type of package, the printed material would be readable on the outside of the package.

While not shown in the drawings, a further example of a laminated flexible packaging material includes a clear layer bonded to a white polyolefin layer having printed material on an outside surface thereof bonded together using the radiation-curable, adhesive composition. The printing can be performed using any conventional method, such as well-known ink and/or electrophotographic techniques. Preferred methods include the use of a flexographic or gravure printing press to apply print in a continuous line.

The layer 22, layer 26 and adhesive layer 24 can be constructed at any thickness as desired for the particular application. For example, the layer 22 is usually about 0.1 to about 5 mils thick, preferably about 0.3 to about 3 mils thick. The adhesive layer 24 is usually about 0.03 to about 1 mil thick, preferably about 0.05 to about 0.2 mils thick. The layer 26 is usually about 0.1 to about 5 mils thick.

Figure 4:
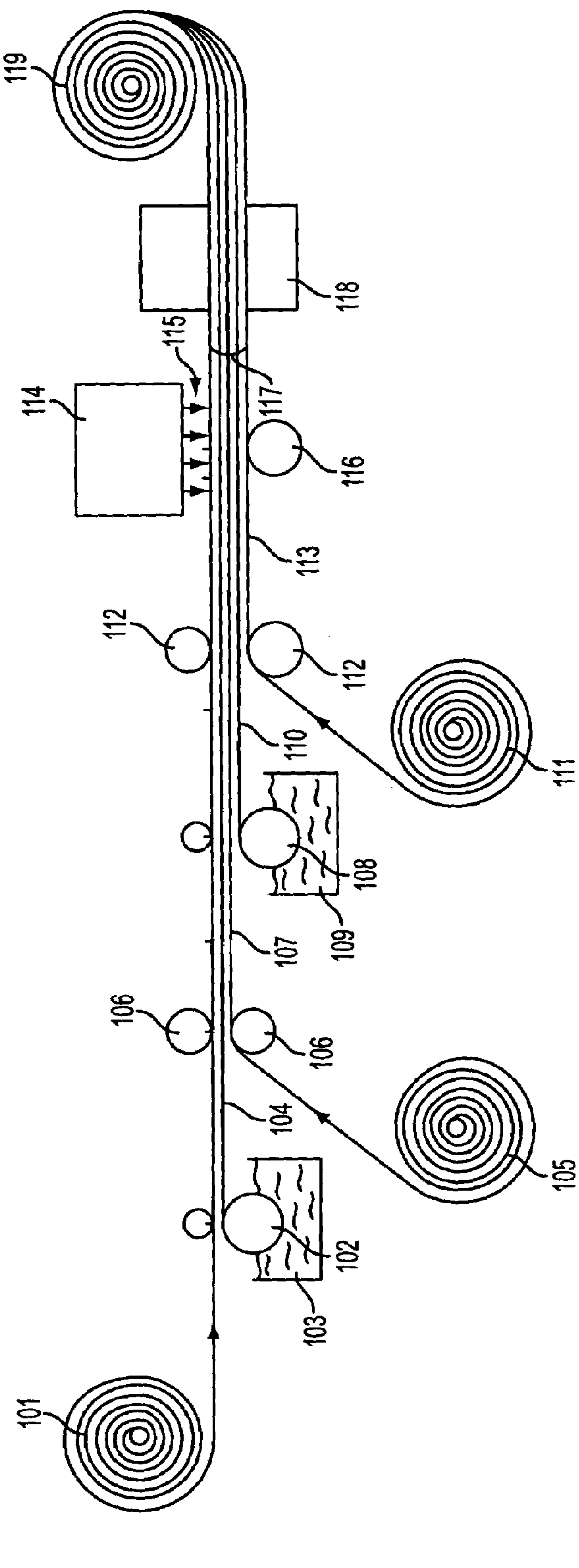
FIG. 4 illustrates a side view of a radiation lamination process.

The laminated flexible packaging material can be formed by using any conventional process. FIG. 4 illustrates an example of a radiation lamination process for making a 2-layer flexible laminate packaging material, and an optional 3-layer flexible laminate packaging material. Any number of layers can be bonded together using the present radiation-curable adhesive.

A first layer of flexible packaging material 101 is unwound. The first layer 101 may be fed from a roll or directly from a printing press used to apply graphics to the packaging. An adhesive coating 103 is applied to the layer 101 using the coating application roller 102 to form and adhesive coating layer 104. This is a simplified drawing. Many different types of roll coating methods may be used including methods with up to about 6 rollers. The adhesive reservoir holding the adhesive coating 103 may be open or closed. Liquid adhesive may also be pumped from a feed system. The adhesive application system including the adhesive 103 and roller(s) 102 may be at be at ambient temperature, or heated facilitate achieving the desired application weight and flow properties.

A second layer of flexible packaging material 105 is unwound and applied to the adhesive coating layer 104 using the nip rollers 106 to form a 2-layer laminate 107. The nip rollers 106 can be made of various different materials including, for example, rubber, steel, and ceramic. Roll pressure can be set for best performance and appearance. The rollers 106 may be at ambient temperature or heated.

An optional second laminating adhesive application roller 108 can be used to apply a second adhesive coating 109 to form an adhesive coating 110 on the laminate 107. The optional third layer of flexible packaging material 111 is unwound and applied to the adhesive coating 110 using the optional second set of laminating nip rollers 112 to form a 3-layer laminate 113.

Electron beam generating unit or UV lamp unit 114 then applies accelerated electrons or UV radiation to the laminate 113 to cure at least one of the adhesive coatings 104 and/or 110. If UV is used, the layer(s) of flexible packaging materials must allow at least partial transmission of UV light to cure the adhesive(s). Opaque or printed materials may be used with EB since accelerated electrons can penetrate through layers of opaque packaging materials. EB accelerating potential should be at least high enough to penetrate the layers of packaging materials to cure the adhesives. The equipment should be shielded to prevent worker exposure to the UV light or secondary x-rays which are associated with EB generation. An optional back-up roller or beam dump 116 may be chilled to control excess heat from the curing process.

Commercial electron beam generating units are available from multiple suppliers including Energy Sciences Inc., (ESI) and Advanced Electron Beams (AEB). The penetration of the electrons into the packaging material is determined by the acceleration potential of the beam. Generally a range of potentials from about 60 to 250 KV is appropriate for most flexible packaging laminations. A range of about 70 to 170 KV is preferred. The total electron beam energy (dose) applied to the material is measured in units of Mrads. A range of dosages from about 0.5 to 6.0 Mrads is appropriate for curing the adhesives of the present invention. A dosage range of about 1.0 to 4.0 Mrads is preferred.

The cured laminate 117 can be forwarded to an optional post-cure web processing, which usually includes trimming, slitting, and/or sheeting. The cured laminate 117 can be rewound to form a roll 119 for laminated web of packaging material.

Preferably, both adhesives 104 and 110 are radiation-curable adhesives according to the present invention. However, one of the adhesives may be non-radiation-curable if desired. In multiple layer laminates, at least one adhesive layer must comprise a radiation-curable adhesive according to the present invention. Radiation-curable adhesives must be applied before the curing unit 114. Non-radiation-curable adhesives may be applied before or after the curing unit 114. This is a simplified drawing for illustration purposes. Other web treating, cleaning, handling, and coating accessories are typically part or the process.

The immediate EB or UV cure allows fast in-line processing. In contrast, with other types of laminating adhesives, it is difficult to process in-line since the adhesive may not be adequately cured in a short time period.

The improved laminated flexible packaging material can be used to contain beverages, pharmaceuticals, medical and dental devices, and food products. Preferred examples are snack food packaging, dry food mixes, meat packaging, cheese packaging, and flavored beverage containers. It may also be desirable to use the improved laminated flexible packaging for non-food industrial or consumer packaging. Although taste or and migration may not be a concern for non-food applications, the immediate bonding and resistance to delamination achieved with these new radiation-curable laminating adhesives may be desired. Examples of industrial and consumer non-food applications include packaging wet and dry wipe products.

Figure 5:
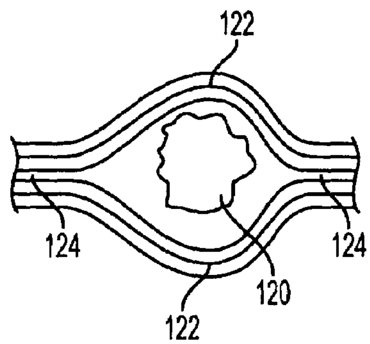
FIG. 5 illustrates a side, cross-sectional view of a packaged product.

The packages can be formed using any conventional process. FIG. 5 illustrates a cross-sectional view of a packaged material 120 contained within the flexible packaging material 122. The edges 124 of the flexible packaging material 122 can be sealed using any conventional sealing method, such as heat sealing or cold sealing using adhesives, as desired.

Laminate Label and Polyolefin Container Having Laminate Label

Figure 6:
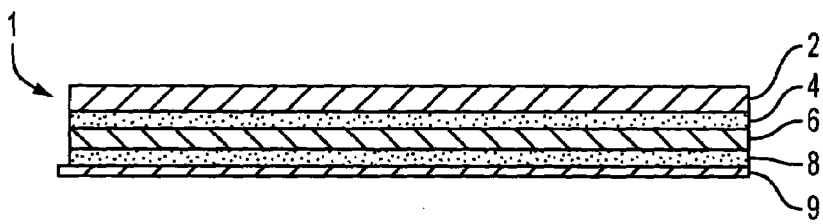
FIG. 6 illustrates a side, cross-sectional view of an improved laminate label according to the present invention.
Figure 7:
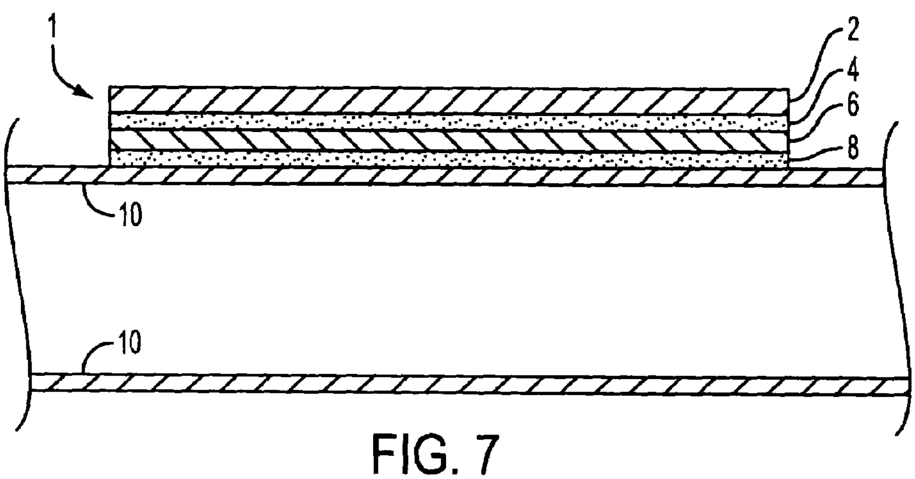
FIG. 7 illustrates a side, cross-sectional view of a polyolefin container suitable for containing a pharmaceutical or food product having the improved laminate label bonded on an outer surface thereof.

As shown in FIG. 6, the laminate label 1 includes a substantially clear or translucent protective polymer layer 2, which is bound to a face stock 6 using the radiation-curable adhesive composition described herein 4. An optional pressure sensitive adhesive layer 8 is shown on the back of the face stock 6 opposing the protective polymer layer 2. The laminate label can also include other layers as desired and commonly used in the art, such as a release liner 9. The release liner 9 should be removed from the label 1 prior to application. The face stock can include printed material formed by well known methods. FIG. 7 illustrates the laminate label 1 bonded to a polyolefin container 10 by the pressure sensitive adhesive 8.

It has been found that radiation-curable monomers usually adsorb into the face stock 6 when applied thereon. The face stock 6 hinders or prevents curing of the monomers adsorbed therein and thus, the adsorbed monomers are not bound in the formed laminate label. Over time, these unbound monomers can migrate through the face stock 6 and pressure sensitive adhesive 8 to reach the polyolefin container 10. The monomers have also been found to undesirably migrate through the polyolefin container 10 and contaminate the contents thereof. The monomers can cause an undesirable odor and/or taste in the container contents.

The radiation-curable adhesive composition according to the present invention is formulated from low-migration, cycloaliphatic carboxylic acid monomers. It has been found that the cycloaliphatic carboxylic acid monomers migrate through polyolefin containers in significantly less amounts than conventionally used monomers in conventional laminate labels.

It has also been found that the cycloaliphatic carboxylic acid monomers used in the present invention provide the unexpected combination of providing sufficient adhesion to low surface energy layers when suitably cured, such as polyolefin protective films, to avoid delamination and they substantially avoid migrating through the walls of polyolefin container 10 when in the free uncured monomer form. The substantially clear protective polymeric layer 2 can be formed from any suitable polymeric material. Examples of suitable polymeric materials include polyolefins, polyesters and polystyrenes. Preferably, the protective polymeric layer is formed from a polyolefin. Examples of suitable polyolefins include, but are not limited to, homopolymers or copolymers of ethylene, butylene, propylene, hexene, octene, etc. Preferred polyolefins include polypropylene and polyethylene, such as high-density polyethylene (HDPE) or linear-low-density polyethylene (LLDPE), polyiosbutylene (PIB). Polypropylene is especially preferred. Oriented forms of polypropylene can be used as desired, such as biaxially oriented (BOPP) or oriented polypropylene (OPP). When using ultra-violet (UV) light to cure the radiation-curable adhesive composition, a polymeric material should be selected which does not prevent or substantially inhibit curing of the radiation-curable adhesive by absorbing or shielding the UV light. However, when electron beam curing is used, the polymeric material selected can be substantially more opaque than when UV curing. The protective polymeric layer 2 is usually about 0.2 to about 2 mils thick, preferably about 0.4 to about 1.5 mils.

Face stocks are well known in the label art. The face stock usually contains printed material in form of ink and/or from electrophotographic techniques. Any suitable face stock can be utilized in the present invention. While bleached kraft paper is the most often used face stock material for labels, the face stock can be formed from synthetic polymeric materials, such as polyolefins, polyesters and polyvinylchlorides, if desired. The face stock can also be formed from combinations of synthetic and plant fibers, in woven or non-woven forms. The present invention is especially useful for face stocks which are capable of adsorbing radiation-curable monomers, such as fibrous materials formed from synthetic and/or plant fibers, or porous polymeric films. Suitable face stocks are disclosed in U.S. Pat. Nos. 5,284,688 and 5,830,571, which are incorporated herein by reference.

Once the printed material is formed on the face stock, the protective polymeric layer and radiation-curable adhesive composition can be applied to the face stock using well known techniques. A preferred method includes use of a flexographic printing press to print the face stock and apply the radiation-curable adhesive in line. The radiation-curable adhesive composition can be cured by well known methods, such as by UV light from medium pressure mercury lamps or low intensity fluorescent lamps directly through the protective polymeric layer. Alternatively, electron beam radiation may be used to cure the radiation-curable adhesive composition. The laminate label can be formed using the UV curing methods described in U.S. Pat. Nos. 5,262,216 and 5,284,688, if desired.

Pressure sensitive adhesives are now well known in the label art. Any suitable pressure sensitive adhesive can be used on the laminate label according to the present invention. U.S. Pat. Nos. 5,202,361, 5,262,216, 5,284,688, 5,385,772, and 5,874,143, disclose examples of suitable pressure sensitive adhesives that can utilized in the laminate label, which are incorporated herein by reference. The pressure sensitive adhesive can be applied to the laminate label using well known techniques, such as shown in U.S. Pat. No. 5,861,201, the complete disclosure of which is incorporated herein by reference.

Examples of suitable polyolefin containers include, but are not limited to, beverage or water containers, pharmaceutical containers, and food containers. Intravenous bags, polyolefin wraps, and bottles are also examples suitable polyolefin containers. The polyolefin container can be formed from any of the polyolefin materials described herein.

Laminated Folding Cartons

Laminated folding cartons are well known. The cartons are typically based on paper board materials. The cartons are commonly used to package a variety of non-food, food, pharmaceutical, consumer, and industrial products. The folding carton may be the primary package for the product or may include various secondary packaging such as plastic or glass containers, bags, etc. Various types of polymer films may be laminated to the cartons. These can include essentially all of the films discussed in the flexible packaging discussion above. Metal foils such as aluminum foil may also be laminated to the cartons. The laminate layer may be on the inside surface or the outside surface of the carton. In some cases multiple laminate layers may be used. The most common purpose of the laminate layer is to enhance the appearance or improve the barrier properties of the carton. The layer may also provide other functional properties such as to allow heat sealing or to enhance the mechanical strength. Examples include film lamination of powdered detergent cartons to provide moisture resistance and metallized film lamination to provide enhanced appearance for packaging liquor, cosmetics, etc. In most cases the carton is also printed with the desired graphics. If the laminate layer is on the outside of the carton the printing may be on top of the laminate. Films that are substantially clear may be printed on the inside surface prior to being laminated to the carton. This results in enhanced appearance as well as protection of the printed graphics. The lamination process may be in-line or with the printing, or may occur in a separate process before or after the printing. Cartons are generally printed in a web or sheet-fed process. The lamination may be applied to a web or sheet; however, lamination of a web is generally preferred.

Many methods are used to adhere the laminate layer to the carton, including extrusion and adhesive lamination. The advantages of radiation curable adhesives discussed above also apply to folding carton applications. In particular, the instant bonding characteristics allow immediate processing such as in-line printing, die cutting, gluing, etc. Radiation curable adhesives also provide energy savings compared to energy needed to operate a thermal dryer used with conventional water or solvent based adhesives. UV and EB equipment is also much smaller than the large thermal dryers often used to laminate folding carton materials. This enhances the ability to integrate in-line printing or processing of the carton.

The advantages of using radiation curable adhesives containing cycloaliphatic carboxylic acid functional monomers of the present invention include enhanced bonding performance, product resistance, low odor, and low migration.

As discussed above, when UV adhesives are used to laminate the carton the laminate layer should be substantially clear to allow penetration of UV light. EB adhesives may be cured though clear laminate layers or opaque layers that include printed, filled, and metallized films.

Other Adhesive Laminating Applications

While the primary applications for radiation curable laminating adhesives containing cycloaliphatic carboxylic acid functional monomers are expected to be for packaging and labels as discussed above, it is believed that these adhesive compositions will also be useful in a wide variety of other bonding and laminating applications due to their superior properties. These other applications include but are not limited to: 1) laminated cards for identification, membership, and promotional uses, 2) laminated optical and magnetic data storage media, 3) laminated graphic and electronic display applications, 4) laminated decorative materials for furniture construction, and 5) laminated decorative and structural materials for building and construction applications.

EXAMPLES

The invention will now be further described with reference to the following non-limiting Examples and Comparative Examples. The migration of the carboxylic acid functional monomers of the radiation-curable, adhesive composition have been tested using food industry standards and the results are provided in our earlier U.S. Pat. Nos. 6,720,050 and 6,472,056. Those test results clearly demonstrate that the carboxylic acid functional monomers migrate through layers of a laminated flexible packaging material to a significantly less degree than monomers utilized in conventional radiation-curable adhesives. Thus, the improved radiation-curable, adhesive composition is capable of providing an adhesive layer which substantially reduces the risk of uncured monomers migrating through flexible packaging layers and contaminating the contents of a packaged product with uncured monomer.

The following test results demonstrate that the present radiation-curable adhesives containing cycloaliphatic carboxylic acid functional monomers exhibit reduced skin irritation, and when suitably cured they exhibit unexpectedly improved adhesion and resistance to delamination, especially when liquids are present, as well as significantly reduced migration.

Example 1

MAHP was roll coated at a rate of about 1.3 pounds/3000 $ft^2$ onto a web of 2 mil thick linear low density (LLDPE) packaging film. A second web of 0.48 mil polyester (PET) packaging film (trade name, DuPont Melinex 813) was nipped to the liquid layer of MAHP. The moving web was irradiated though the polyester film with an electron beam produced by a commercial accelerator operating at 110 kV with an applied dose of about 3.0 Mrads. The MAHP was immediately polymerized to bond the polyester and the LLDPE film. The bond strength of the resulting laminate structure was tested by a T-peel method. The test resulted in immediate tearing of the PET film at a maximum strength of 297 grams/inch. The test was repeated after soaking the laminate overnight between layers of water saturated paper towels. Immediate film tear was again achieved with a maximum strength of 490 g/in.

Example 2

The method of Example 1 was repeated using 1 mil thick aluminum foil instead of the LLDPE film. The T-peel test resulted in film tear of the PET film at a maximum strength of 326 g/in. The test was repeated after immersing the laminate for 4 hours in water. The average peel strength was 213 g/in with a peak strength of 328 g/in.

Example 3

The method of Example 1 was repeated using a 0.7 mil thick oriented polypropylene (oPP) film (trade name Mobil SPW) in place of the PET film. The laminate gave immediate tearing of the oPP upon attempting to delaminate the two films.

Example 4

The methods and materials from Examples 1, 2, and 3 were repeated except that MAMHP was used in place of the MAHP to bond the films. The results are shown in the Table 1 below. It was surprising and unexpected to see that the bond strength of the PET laminated actually increased under wet conditions.

TABLE 1

| Laminate | PET/LLDPE | PET/Al foil | oPP/LLDPE |
|---|---|---|---|
| Avg. Dry Bond (g/in) | 225 | 160 | Tear |
| Peak Dry Bond | 272 | 225 | Not Tested |
| Avg. Wet Bond | Tear | Tear | Not Tested |
| Peak Wet Bond | 540 | 358 | Not Tested |

Example 5

A formulated EB curable laminating adhesive was prepared and tested according to the method described in Example 1. The results are shown in Table 2.

TABLE 2

| Formula Component (weight percent) | |
|---|---|
| MAHP | 59.8 |
| MAES | 30.0 |

TABLE 2-continued

| | |
|---|---|
| Urethane Acrylate Oligomer (Sartomer CN973) | 8.5 |
| Diethyleneglycol monoethylether acrylate (Sartomer SR256) | 1.5 |
| Fluorosurfactant (Ciba, Lodyne s107b) | 0.2 |
| Laminate Peel Strength (g/in) | |
| Dry Peel PET/LLDPE | Tear, 444 peak |
| Wet Peel Strength PET/LLDPE | Tear, 307 peak |
| Dry Peel PET/Al foil | Tear, 405 peak |
| Wet Peel PET/Al foil | 190 avg, 296 peak |

Example 6

The adhesive of Example 5 was used to laminate 0.70 mil oPP to 2.0 LLDPE using the method described in Example 1. The resulting laminate structure was placed in a single-sided extraction cell. The oPP side of the laminate was extracted for 10 days at 40° C. with 10 milliliters of 95% ethanol for each square inch of laminate surface area. Analysis of the resulting ethanol solution showed a MAHP concentration of less than 25 ppb.

Example 7

UV Curable laminating adhesive formulations were prepared using a cycloaliphatic carboxylic acid functional monomer (MAHP) as shown in Table 3. For comparison, the adhesives were applied side-by-side with an adhesive based on a linear aliphatic carboxylic acid functional monomer (MAES). The adhesives were applied with 360 line/in flexographic hand-proofer. A 0.75 mil oPP film was used (Mobil LBW). Laminations to clay coated paper board were also tested. The laminates were cured with a 300 w/min medium pressure mercury arc lamp mounted on a variable speed conveyor. The results are shown in Table 3. The results show improved bonding using the formulations containing the cycloaliphatic carboxylic acid functional monomer.

TABLE 3

| | A | B | C | D | E | Control |
|---|---|---|---|---|---|---|
| MAHP (%) | 97 | 56.9 | 82 | 87 | 47 | |
| Photoinitiator (Darocur 2959) | 3 | 3 | 3 | 3 | 3 | |
| Benzyl dimethyl ketal | | | | | | 2 |
| MAES | | 40 | | | 50 | 97.9 |
| FC4430 | | 0.1 | | | | |
| Ethoxylated nonylphenol acrylate (Sartomer SR504) | | | 15 | | | |
| Diethylene glycol monomethyl ether acrylate (Sartomer SR256) | | | | 10 | | |
| Acrylated Silicone | | | | | | 0.05 |
| Optical Brightner | | | | | | 0.05 |
| Peel Strength vs. Control (g/in) | | | | | | |
| oPP/oPP (100 ft/min) | 373/136 | 259/67 | 191/142 | 164/114 | 182/131 | |
| oPP/oPP (200 ft/min) | 329/84 | 125/78 | 128/101 | 115/78 | 128/52 | |
| oPP/paper board (100 ft/min) tape backed | 362 cs/tear | 410 t/308 | 308 cs/356 | 404/290 | 657 cs/471 | |
| oPP/paper board (200 ft/min) tape backed | 333 cs/382 | 749 t/319 | 280 cs/375 | 315/286 | 786 cs/321 | |

t = film tear
cs = clay split

Example 8

A series of electron beam curable laminating adhesives were prepared. The adhesives gave excellent film destruct bonds to a variety of flexible packaging substrates. The maximum strength at tear was related to the dynamic mechanical properties of the cured adhesives. Adhesive and substrate combinations were identified, which produced excellent water and food product resistance.

Experimental:

The dynamic mechanical (DMA) properties of the adhesives were determined using adhesive samples spiked with 1.0% of a photoinitiator (Lucirin TPO). The samples were UV cured isothermally at room temperature with a constant frequency of 5 Hz using a Reologica Instruments Stresstech HR rheometer equipped with a quartz window and UV light source. The cured samples were then transferred to a Reologica Instruments Stresstech DMA and characterized in as a function of temperature from 120 to −10° C.

The following substrates were used for EB lamination:

Linear low density polyethylene (LLDPE)—Pliant Max 200-1, 50 micron (2.0 mil)

Corona treated polyester (PET)—DuPont LBT, 12 micron (0.48 mil)

Chemical treated polyester—DuPont Melinex 813, 12 micron (0.48 mil)

Oriented polypropylene (oPP)—Exxon Mobil LBW, 19 micron (0.75 mil)

Metallized polypropylene—Exxon Mobil MET, 18 micron (0.70 mil)

Aluminum foil, 25 micron (1.0 mil)

The adhesives were applied to the base web at room temperature with an offset gravure coater. The applied weight of adhesives was 2.1±0.3 $g/m^2$ (1.3±0.2 pounds/3000 $ft^2$). The top web was nipped to the wet adhesive followed by EB curing at 3.0 Mrads at 110 kV using and Energy Sciences Electrocure Unit. The metallized oPP was corona treated on the metallized surface in-line prior to adhesive application. All other films were pretreated by the manufacturer and used without additional treatment.

Film destruct bond properties were confirmed by hand testing immediately after EB curing. Bond strengths were measured using 25.4 millimeter (1.0 inch) wide sections of laminates in the machine direction using an ATS Tensile Tester in a 90 degree (T-peel) configuration at 10 inches per minute. Wet bond strengths were measured by soaking the 1.0 inch-wide strips between water saturated layers of paper towels overnight at room temperature. Bond strengths were measured immediately upon removal of the strips from the saturated paper towels.

Food product resistance was determined by forming the LLDPE-based laminates into heat sealed pouches containing the test materials. Sunny Delight™ was used to test resistance to aqueous acidic foods. A solution of 50% corn syrup in water was used to test resistance to aqueous sweet foods. Corn oil was used to test fatty food resistance. The pouches were inspected after two weeks at room temperature and under refrigerated conditions. Sections of the pouches were then cut into 1.0 inch wide strips for peel testing of the laminate as described above.

Adhesive Properties:

A series of four EB curable adhesives were used in this study. The compositions of the adhesives were varied to include a range of hydrophobic and dynamic mechanical (DMA) properties (Table 4). Although these adhesives were designed for EB curing, it was desirable to use UV curing methods to characterize the DMA properties. The adhesives were cured between the plates of the rheometer while monitoring the viscosity.

TABLE 4

EB Curable Adhesive Properties

| | F | G | H | I |
|---|---|---|---|---|
| MAES | 75 | 65 | 55 | 45 |
| MAHP | 25 | 35 | 45 | 55 |
| Viscosity (cps @25° C.) | 355 | 473 | 593 | 852 |
| Relative Hydrophobicity | 1 | 2 | 3 | 4 |
| Cured Tg (° C.) | 21.5 | 22.4 | 27.6 | 29.2 |

Figure 8:
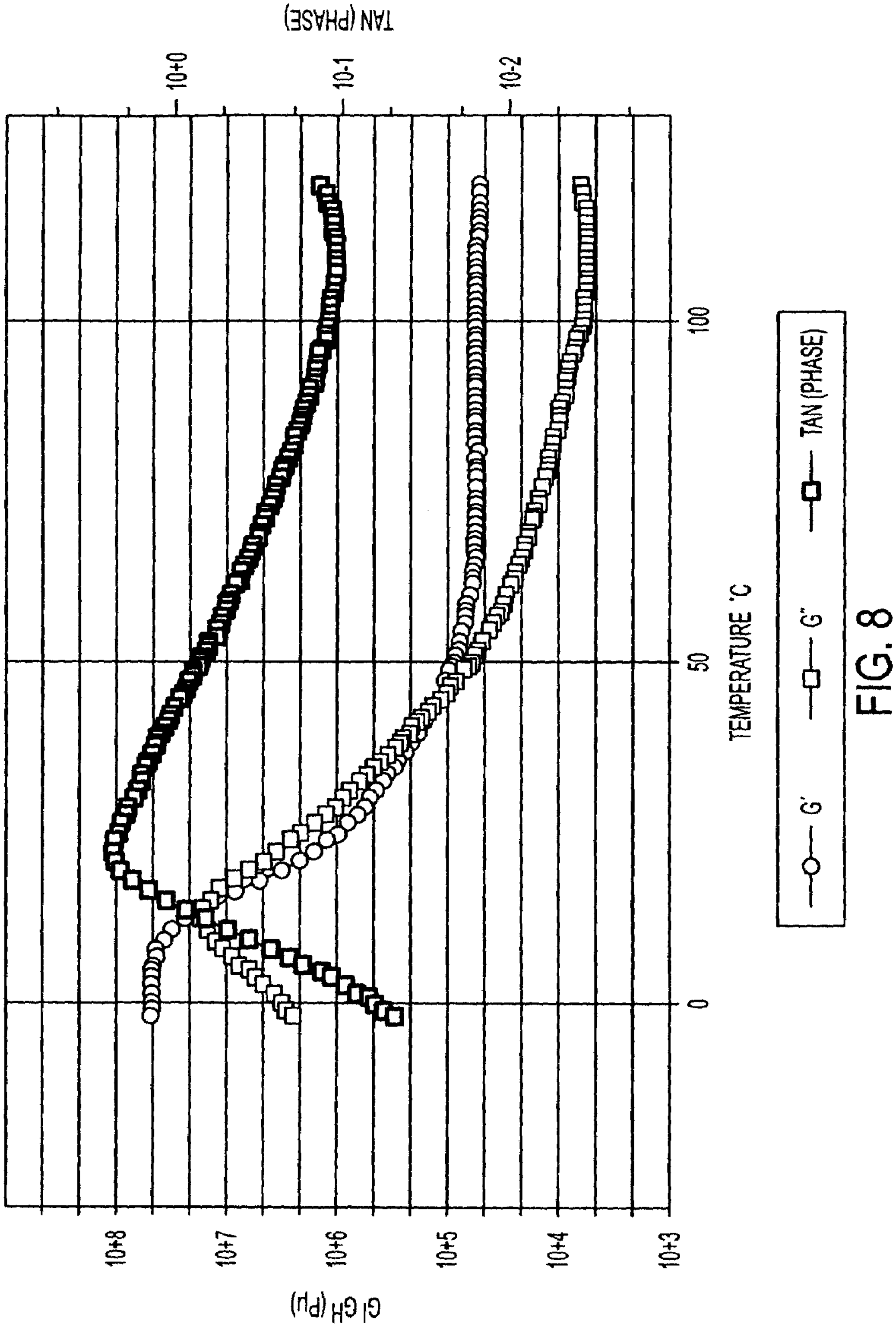
FIG. 8 illustrates a graph of DMA properties of an example according to the present invention after UV curing with a photoinitiator.
Figure 9:
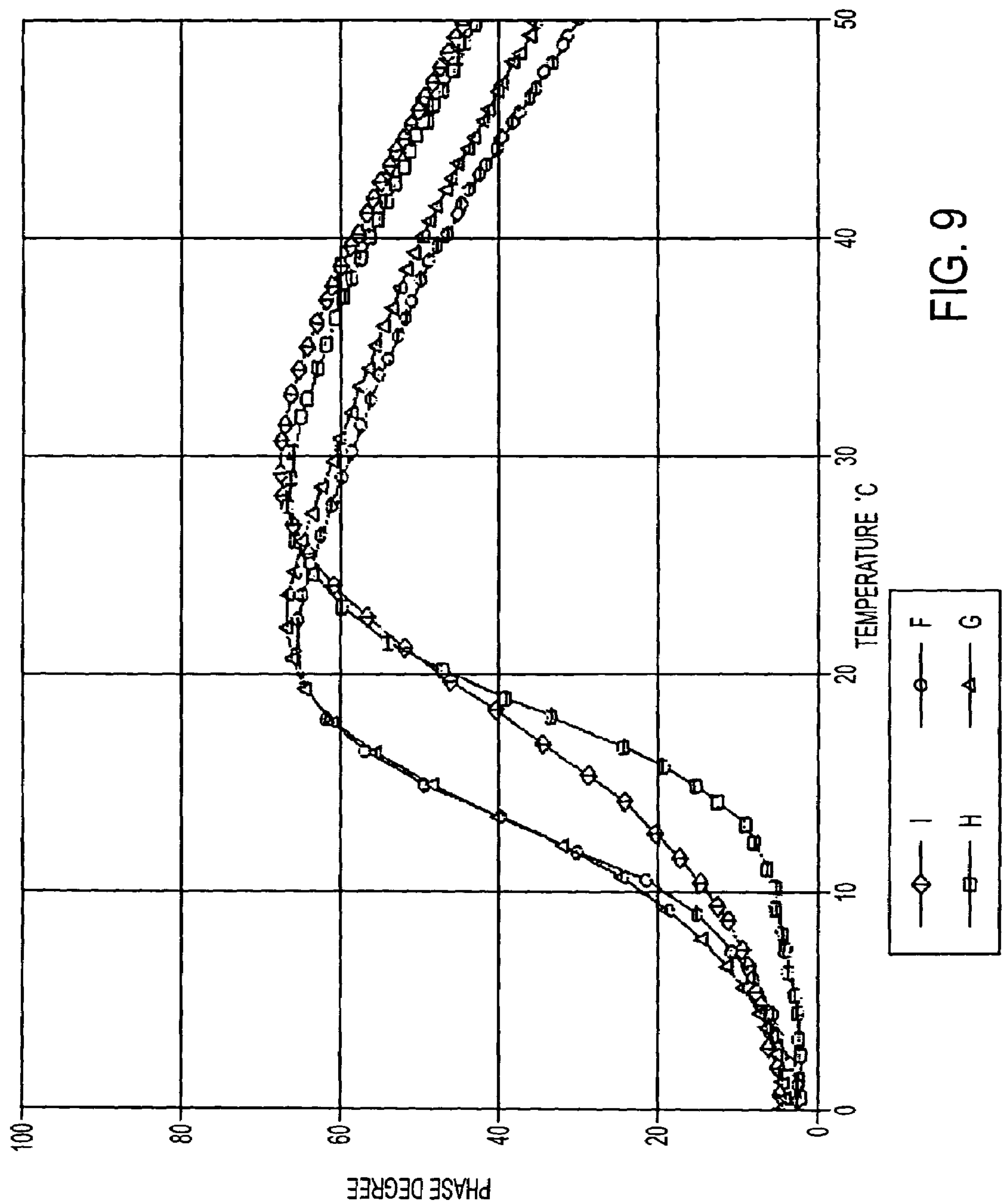
FIG. 9 illustrates a graph of the tan delta plots of an example according to the present invention after UV curing with photoinitiator.
Figure 10A:
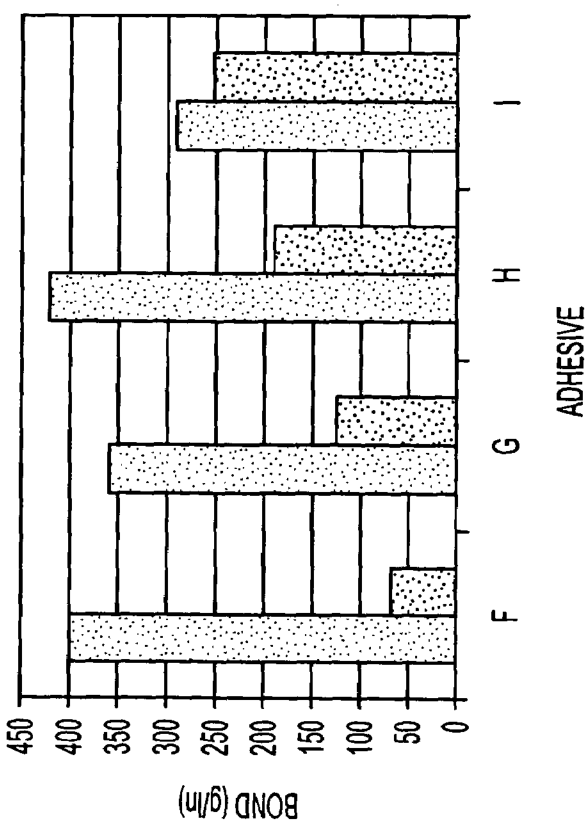
FIGS. 10A–10E illustrate graphs of the bond strengths of examples according to the present invention.
Figure 10B:
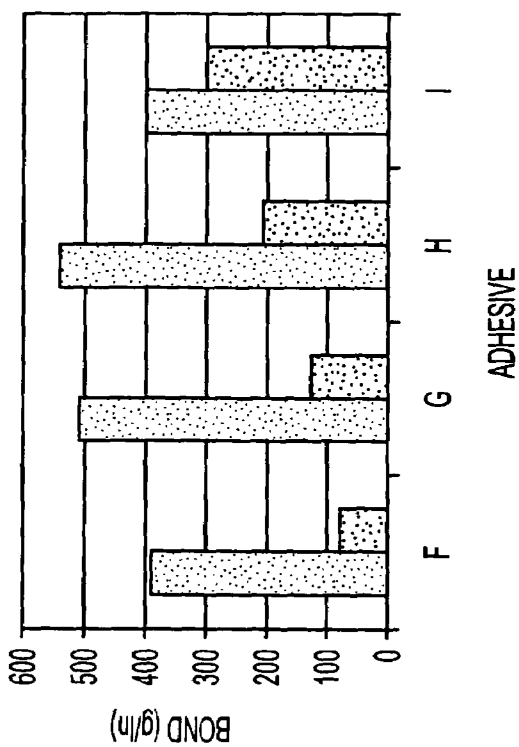
Figure 10D:
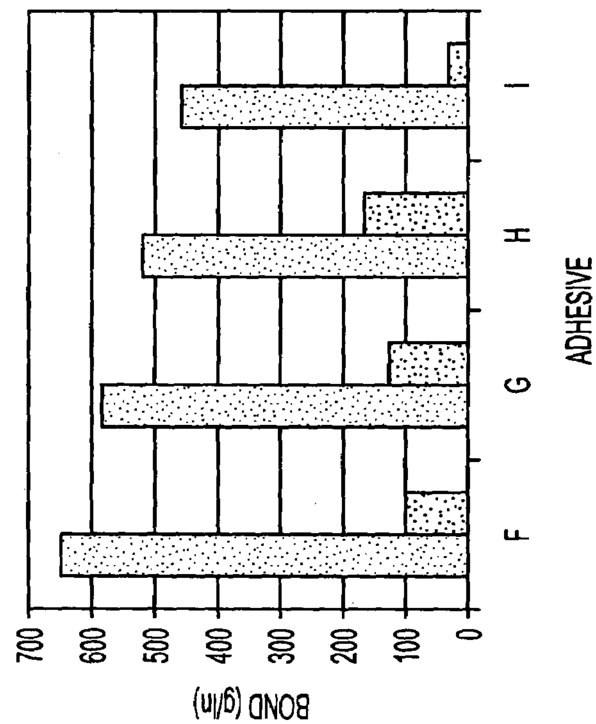
Figure 10C:
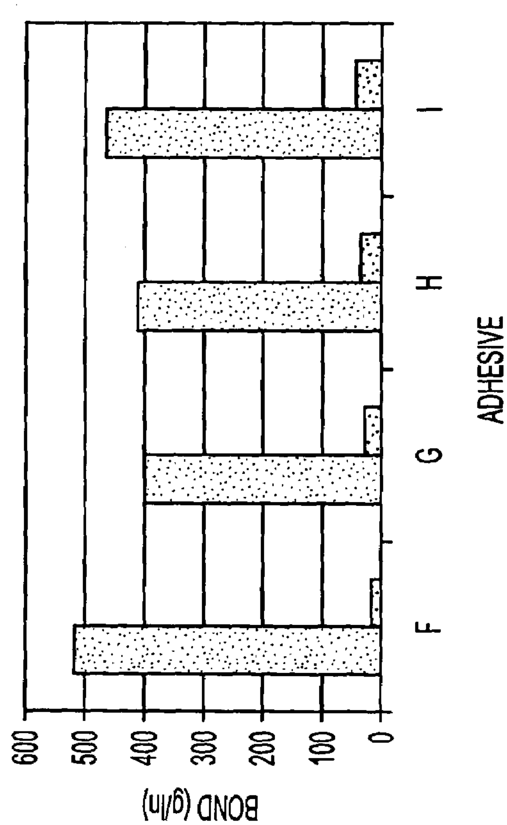
Figure 10E:
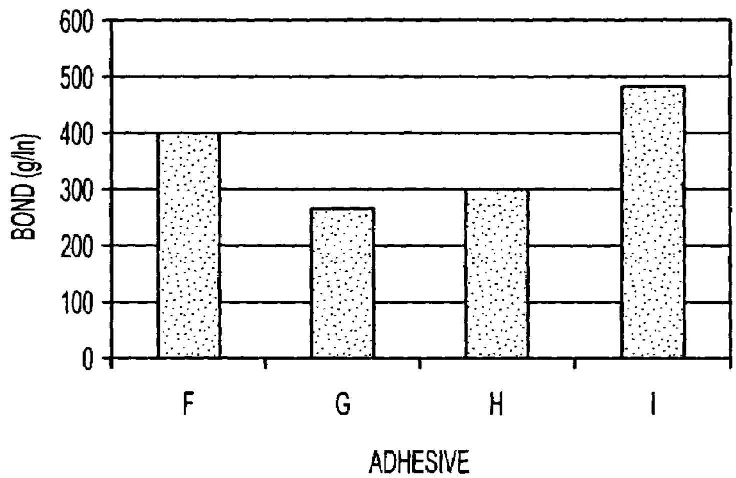

Following UV curing, the dynamic mechanical (DMA) properties of the adhesives were characterized as a function of temperature. A representative DMA plot for the cured G adhesive is shown in FIG. 8. The glass transition temperature ($T_g$) of the cured adhesives can be determined from the ratio (tan delta) of the loss (G") to storage (G') modulus. The tan delta curve for all four adhesives is shown in FIG. 9. The peaks values ($T_g$) taken from the data are shown in Table 4.

Bond Properties:

Bond strengths under both dry and wet conditions are shown in FIGS. 10A through 10E for the various substrate combinations. All substrates with all four adhesive combinations gave film destruct bonds when tested under dry conditions, which means the adhesive bond was stronger than the films. It has been reported that is generally desirable to have adhesive glass transition temperatures near the adhesive use temperature in order to maximize bond strength. The present examples having Tg's in a range from about 20 to about 30° C. demonstrate that the bond strength is maximized when the Tg is near the operating range. However, these examples also surprisingly show increased bond strength well beyond the Tg temperature as described above in reference to the plateau modulus shown in FIG. 8.

The maximum bond strength that was reached upon film destruct appeared to be dependant on the adhesive that was used. The relationship between the maximum bond strength and the $T_g$ was different for the different film combinations. The chemically treated PET/LLDPE (FIG. 10B) had maximum bond strengths with the intermediate $T_g$ adhesives. The oPP/LLDPE bond strength at film tear (FIG. 10D) decreased as the $T_g$ of the adhesive increased. The oPP/metallized oPP laminates appeared to have the strongest bonds at both with the lowest and highest $T_g$ adhesives. There was also an unexpected contrast in the maximum dry bond strength of the chemically treated and non-chemical treated PET films laminated to LLDPE (compare the dry bond strengths in FIGS. 10B and 10C).

After soaking in water, the laminates could be peeled without tearing the films. In many cases, acceptable bond strengths in excess 150 g/in remained after water soak. The wet bond strengths increased for the series of adhesives with increasing cycloaliphatic carboxylic acid functional monomer (MAHP) content. There was a large contrast in the wet bond strength of chemical treated and non-chemical treated PET (compare the wet bond strengths in FIGS. 10B and 10C).

Food Product Resistance:

The test pouches were inspected for delamination upon aging. The only test pouch to show any sign of delamination (tunneling) was the corona treated PET/G/LLDPE laminate with the aqueous sweet test substance aged at room temperature. No delamination was observed in any of the other laminates.

Figure 11A:
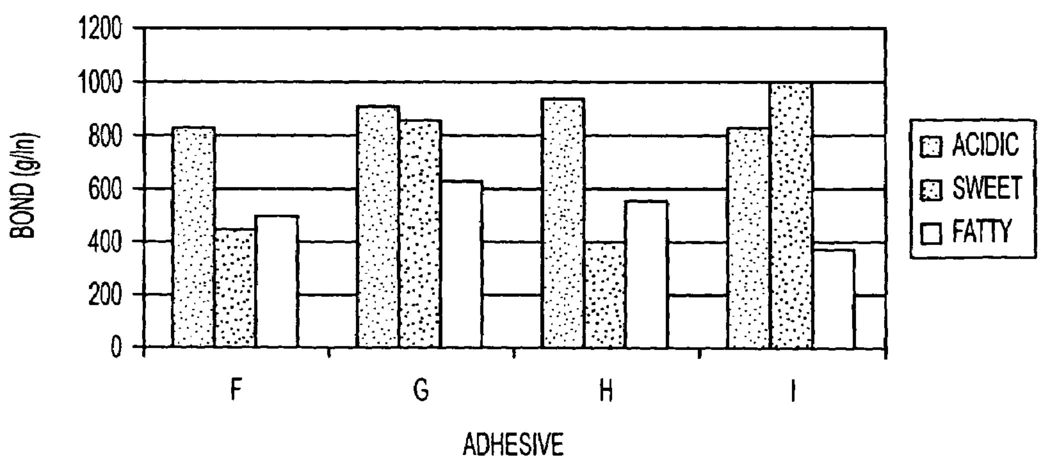
FIGS. 11A–11C illustrate graphs of resistance to food products of examples according to the present invention.
Figure 11B:
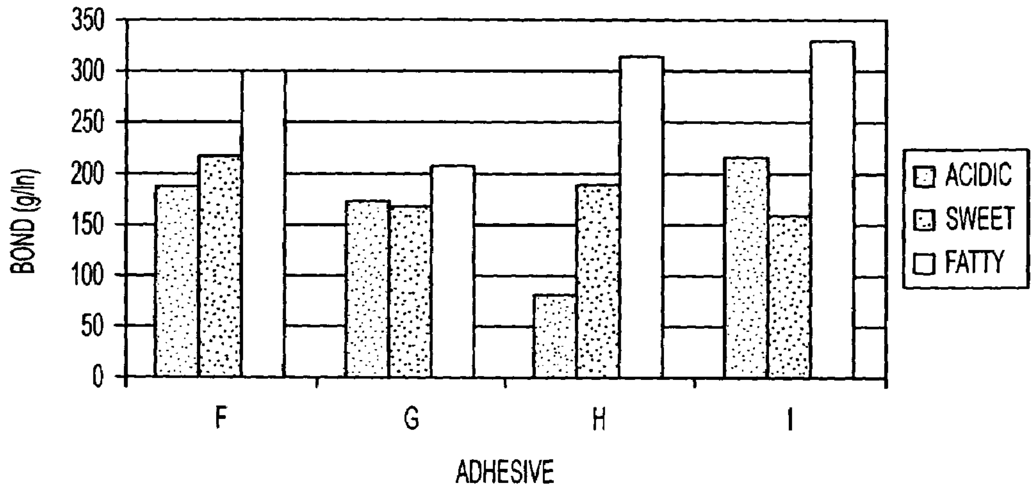
Figure 11C:
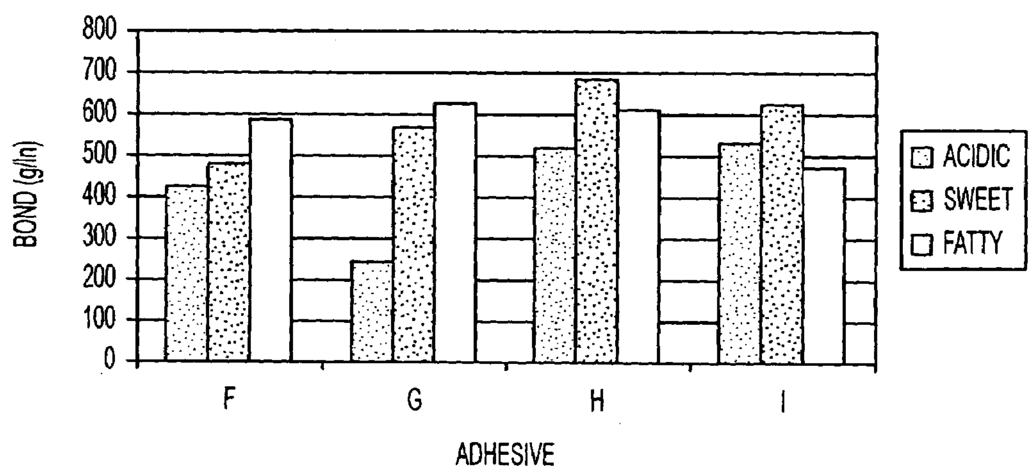

The bond strengths of room temperature aged pouches are shown in FIGS. 11A through 11C. All of the pouches exhibited film tear upon peel testing, which demonstrates that the adhesive was stronger than the films. This was a combination of sliver and straight tears. The results shown are average peel values before the sliver tear began. In the case of straight tears, the maximum value upon tear was recorded.

The results show excellent food product resistance with many of the laminates maintaining greater than 400 g/in. There is no clear relationship between the adhesive that was used and the food product resistance. The most obvious trend was the difference between the chemical treated and corona treated PET laminates (compare FIGS. 11A and 11B). The pouches with aqueous acidic and sweet test materials showed substantially greater bond strengths with the chemically treated PET. This is consistent with the water soak tests reported above and shown in FIGS. 10B and 10C. The magnitude of bond strengths with corona treated PET was greater for pouch tests compared to water soak tests (compare FIGS. 10C and 10B). This is believed to be, without being limited thereto, due to the water barrier properties of the LLDPE film. The difference in bond strengths between the chemical and corona treated PET was relatively small when the fatty test material was used. The results show that these adhesives surprisingly are suitable for PET laminated packaging without using chemically treated film.

In this example, adhesive/substrate combinations were identified which provided excellent bonding properties under dry and wet conditions and also upon testing with different types of food products. This example clearly shows the advantages of using radiation curable laminating adhesive compositions containing cycloaliphatic carboxylic acid functional monomers for bonding a wide variety of packaging materials.

Example 9 and Comparative Example

EB curable laminating adhesive compositions were prepared in order to compare the performance of a cycloaliphatic carboxylic acid functional monomer (HEA/hexahydophthalic anhydride half ester, MAHP) to the corresponding aromatic monomer (HEA/phthalic anhydride half ester, MAEP):

Formula J: MAES 45%, MAHP 45%, Laurel Acrylate 10%

Formula K: MAES 45%, MAEP 45%, Laurel Acrylate 10%

The adhesives were applied to an aluminum foil substrate and covered with a printed PET film. The adhesives were EB cured at 3.0 Mrads by irradiation through the PET film. The peel strength of the laminates tested dry and after 1 hour water soak are shown in the Table 5. The results clearly show a dramatic improvement in performance of the cycloaliphatic monomer compared to the corresponding aromatic monomer.

| Formula | Dry Bond Ink (g/in) | Dry Bond Non Ink (g/in) | Wet Bond Ink (g/in) | Wet Bond Non Ink (g/in) |
|---|---|---|---|---|
| J | 423 (film tear) | Straight Film Tear | 108 | 55 |
| K | 232 | 191 | 19 | 12 |

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A laminated material comprising at least two layers bonded together by at least one layer of radiation-cured laminating adhesive, wherein the radiation-cured laminating adhesive is formed by radiation curing a radiation-curable laminating adhesive composition comprising from 10 to 100% of at least one cycloaliphatic carboxylic acid functional monomer and 10 to 90% of one or more radiation-curable, non-cycloaliphatic carboxylic acid functional monomers based on the total weight of the composition.

2. The laminated material according to claim 1, wherein the laminated material comprises a flexible packaging material.

3. The laminated material according to claim 1, wherein the laminated material comprises a label.

4. The laminated material according to claim 1, wherein the laminated material comprises a folding carton.

5. The laminated material according to claim 1, wherein the laminated material comprises a card.

6. The laminated material according to one of claims 2, 3, 4 and 5 wherein the cycloaliphatic carboxylic acid functional monomer is the half-ester of 2-hydroxyethylacrylate and hexahydrophthalic anhydride.

7. The laminated material according to one of claims 2, 3, 4 and 5 wherein the cycloaliphatic carboxylic acid functional monomer is the half-ester of 2-hydroxyethylacrylate and a substituted-hexahydrophthalic anhydride.

8. The laminated material according to claim 7, wherein the substituted hexahydrophthalic anhydride comprises alkyl-hexahydrophthalic anhydride.

9. The laminated material according to claim 8, wherein the alkyl-hexahydrophthalic anhydride comprises methyl-hexahydrophthalic anhydride.

10. The laminated material according to claim 1, wherein the non-cycloaliphatic carboxylic acid functional monomer comprises the half ester of 2-hydroxyethyl acrylate and succinic anhydride.

11. The laminated material according to claim 1, comprising at least 50% of radiation-curable, carboxylic acid functional monomers.

12. The laminated material according to claim 1, wherein the composition consists essentially of radiation-curable carboxylic acid functional monomers.

13. The laminated material according to claim 1, wherein the cycloaliphatic carboxylic acid functional monomer is present in the composition in an amount of from about 20 to about 80% by weight of the total composition.

14. The laminated material according to claim 1, wherein the cycloaliphatic carboxylic acid functional monomer is present in the composition in an amount of from about 30 to about 70% by weight of the total composition.

15. The laminated material according to claim 1, wherein the adhesive has been cured by electron beam irradiation through at least one of the laminate layers.

16. The laminated material according to claim 15, wherein the electron beam has a potential of about 70 to 300 kV and an absorbed dose of about 1.0 to 6.0 Mrads at the adhesive layer.

17. The laminated material according to claim 16, wherein the electron beam has a potential of about 90 to 170 kV and an absorbed dose of about 2.0 to 5.0 Mrads at the adhesive layer.

18. The laminated material according to claim 1, wherein at least one layer of the laminated is substantially transparent to UV light and the adhesive is cured by UV radiation through the substantially transparent UV layer.

19. The laminated material according to claim 18, wherein the UV radiation source is an electrically powered lamp containing mercury.

20. The laminated material according to claim 1, wherein the laminated material comprises three layers adhesively bound together by two adhesive layers, with at least one adhesive layer comprising said radiation-cured laminating adhesive.

21. The laminated material according to claim 1, wherein the laminated material comprises four layers adhesively bound together by three adhesive layers, with at least one adhesive layer comprising said radiation-cured laminating adhesive.

22. A laminated material comprising at least two layers bonded together by at least one layer of radiation-cured laminating adhesive, wherein the radiation-cured laminating adhesive is formed by radiation curing a radiation-curable laminating adhesive composition comprising from 10 to 100% of at least one cycloaliphatic carboxylic acid functional monomer based on the total weight of the composition, and wherein the cycloaliphatic carboxylic acid functional monomer is the half-ester of 2-hydroxyethylacrylate and a substituted-hexahydrophthalic anhydride.

23. The laminated material according to claim 22, wherein the laminated material comprises a flexible packaging material.

24. The laminated material according to claim 22, wherein the laminated material comprises a label.

25. The laminated material according to claim 22, wherein the laminated material comprises a folding carton.

26. The laminated material according to claim 22, wherein the laminated material comprises a card.

27. The laminated material according to one of claims 22, 23, 24, 25 and 26, wherein the cycloaliphatic carboxylic acid functional monomer is the half-ester of 2-hydroxyethylacrylate and or a substituted-hexahydrophthalic anhydride.

28. The laminated material according to claim 27, wherein the substituted hexahydrophthalic anhydride comprises alkyl-hexahydrophthalic anhydride.

29. The laminated material according to claim 28, wherein the alkyl-hexahydrophthalic anhydride comprises methylhexahydrophthalic anhydride.

30. The laminated material according to claim 22, comprising 10 to 90% of one or more radiation-curable, non-cycloaliphatic carboxylic acid functional monomers.

31. The laminated material according to claim 30, wherein the non-cycloaliphatic carboxylic acid functional monomer comprises the half ester of 2-hydroxyethyl acrylate and succinic anhydride.

32. The laminated material according to claim 22, comprising at least 50% of radiation-curable, carboxylic acid functional monomers.

33. The laminated material according to claim 22, wherein the composition consists essentially of radiation-curable carboxylic acid functional monomers.

34. The laminated material according to claim 22, wherein the cycloaliphatic carboxylic acid functional monomer is present in the composition in an amount of from about 20 to about 80% by weight of the total composition.

35. The laminated material according to claim 22, wherein the cycloaliphatic carboxylic acid functional monomer is present in the composition in an amount of from about 30 to about 70% by weight of the total composition.

36. The laminated material according to claim 22, wherein the adhesive has been cured by electron beam Irradiation through at least one of the laminate layers.

37. The laminated material according to claim 36, wherein the electron beam has a potential of about 70 to 300 kV and an absorbed dose of about 1.0 to 6.0 Mrads at the adhesive layer.

38. The laminated material according to claim 36, wherein the electron beam has a potential of about 90 to 170 kV and an absorbed dose of about 2.0 to 5.0 Mrads at the adhesive layer.

39. The laminated material according to claim 22, wherein at least one layer of the laminated is substantially transparent to UV light and the adhesive is cured by UV radiation through the substantially transparent UV layer.

40. The laminated material according to claim 39, wherein the UV radiation source is an electrically powered lamp containing mercury.

41. The laminated material according to claim 22, wherein the laminated material comprises three layers adhesively bound together by two adhesive layers, with at least one adhesive layer comprising said radiation-cured laminating adhesive.

42. The laminated material according to claim 22, wherein the laminated material comprises four layers adhesively bound together by three adhesive layers, with at least one adhesive layer comprising said radiation-cured laminating adhesive.

* * * * *